Jan. 13, 1970 H. W. BOTELER 3,488,824
METHOD FOR ASSEMBLING A VALVE
Filed Dec. 12, 1966 4 Sheets-Sheet 1

INVENTOR.
HENRY W. BOTELER
BY David D. McKenney
ATTORNEY

Jan. 13, 1970

H. W. BOTELER 3,488,824

METHOD FOR ASSEMBLING A VALVE

Filed Dec. 12, 1966

INVENTOR.
HENRY W. BOTELER
BY
David M. Kenney
ATTORNEY

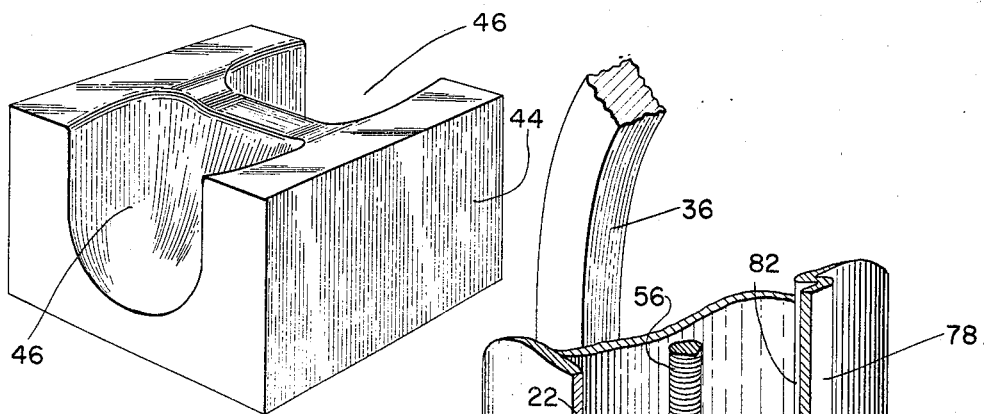
FIG. 5
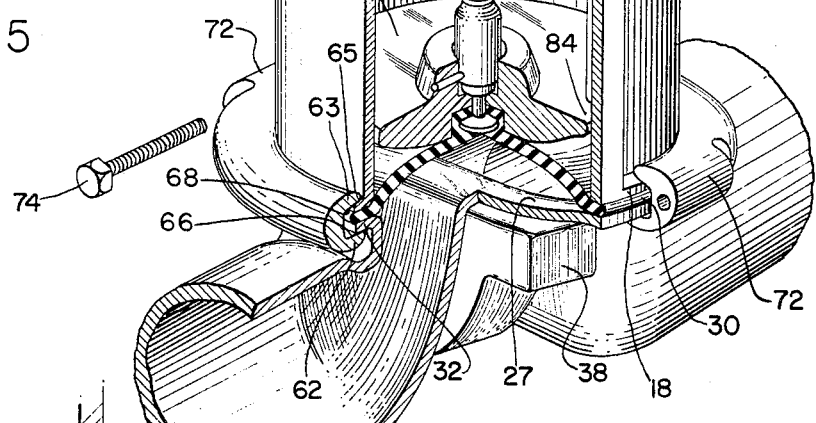
FIG. 7
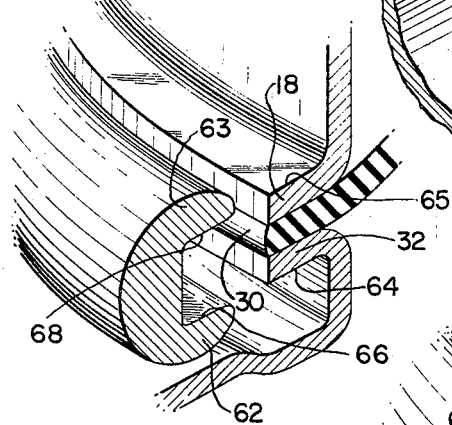
FIG. 7A
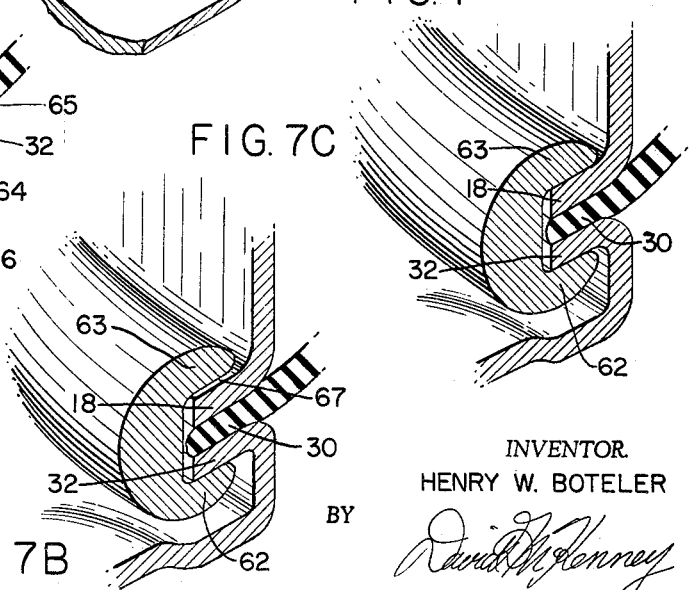
FIG. 7C
FIG. 7B
INVENTOR.
HENRY W. BOTELER
BY
*David H. Kenney*
ATTORNEY

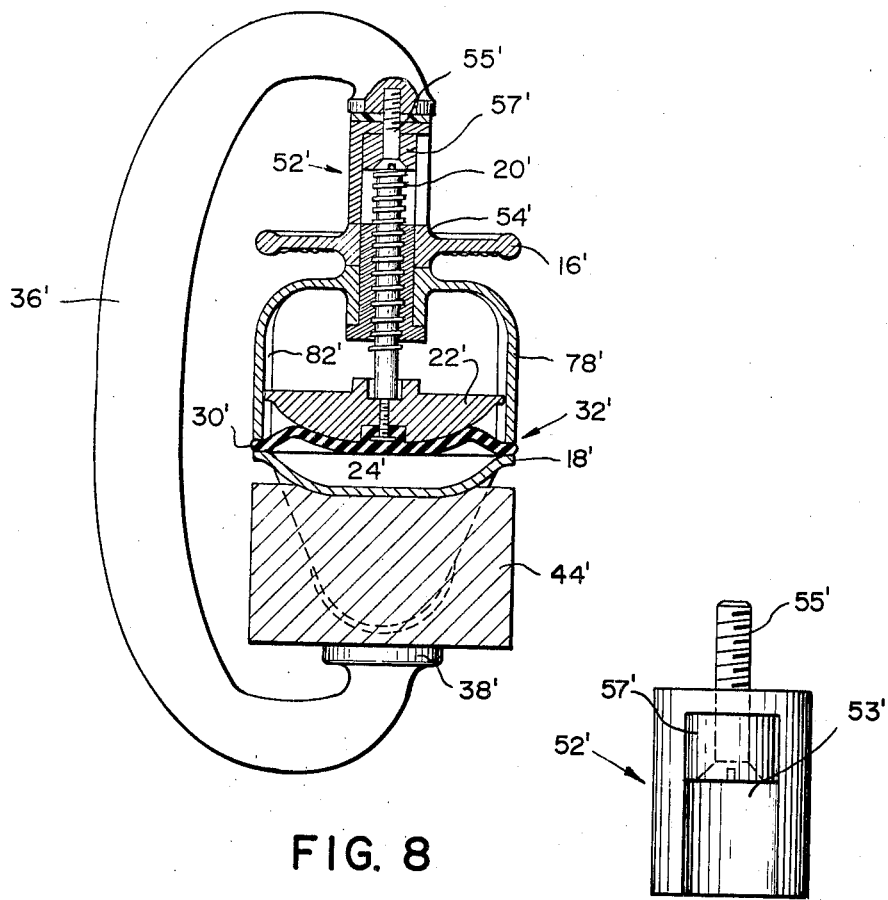

United States Patent Office 3,488,824
Patented Jan. 13, 1970

3,488,824
METHOD FOR ASSEMBLING A VALVE
Henry W. Boteler, East Greenwich, R.I., assignor to Grinnell Corporation, Providence, R.I., a corporation of Delaware
Continuation-in-part of application Ser. No. 278,073, May 6, 1963. This application Dec. 12, 1966, Ser. No. 617,735
Int. Cl. B23p 11/00, 19/04
U.S. Cl. 29—157.1                   1 Claim

ABSTRACT OF THE DISCLOSURE

This disclosure relates to a method of assembling valves of the type having a body and a bonnet, including a valve-activating mechanism, secured together with a sealing member between them. The method includes positioning the body, sealing member, and bonnet with respect to each other, firmly restraining both the body and the bonnet, operating the valve-activating mechanism to develop a force which urges the body and bonnet together, securing the body and bonnet together, and releasing the force.

---

This application is a continuation-in-part of application Ser. No. 278,073, filed May 6, 1963, and now abandoned.

This invention relates to improvements in methods and means for assembling valves. More particularly it has to do with a novel method of preclamping together the bonnet and body of a certain type of valve and then installing a permanent clamping device. It also has to do with novel equipment for accomplishing this preclamping.

Valves with which the present invention can be used are those which have bodies defining the flow passageways and closure member seats and which have separate bonnets sealingly secured to openings in the bodies opposite these seats. These bonnets customarily house actuating mechanisms which move closure members through the body openings and into engagement with the body seats to close the valves.

In some cases these closure members are flexible diaphragms having domed central portions surrounded by flat peripheral portions which are clamped between flanges around the body openings and corresponding flanges around the ends of the bonnet flanges. In other cases the closure members are plugs or gates with separate gaskets which are clamped between the body and bonnet flanges.

In all such cases it has been necessary to provide the bodies and bonnets of such valves with structure for drawing these parts together with enough force to achieve a seal at the diaphragm peripheral portions or at the gaskets, as the case may be. Conventionally, this structure has comprised multiple pairs of opposed apertured lugs on the body and bonnet, respectively, with bolt and nut assemblies which pass through them and draw them together.

Where the valve bodies have been thick walled castings these lugs have usually been formed as integral parts of the body flanges, but where the valve bodies have been formed from pieces of thin walled pipe and tubing it has been difficult to provide such lugs. The flanges still offer the best opportunity, but they are generally too thin to have the required strength. Separate lugs can be welded to the body, but this solution is undesirable because of its expense.

One solution to this problem is the recently proposed segmented, articulated or flexible clamp which, in one of its preferred forms, comprises a pair of rigid semi-circular strap portions each with an inner groove providing a U-shaped cross-section in which the legs of the U-shape have diverging inner surfaces. When drawn together around the body and bonnet these strap portions receive the flanges in the groove and the legs of the U-shape wedge these flanges against the diaphragm peripheral portion or gasket. The substantially continuous engagement of this clamp against the body and bonnet flanges makes it unnecessary for the flanges themselves to be especially heavy and strong, and the rigidity required in the assembled valve (to prevent distortion during closure) is afforded by the laminar effect of the clamp, flanges and sealing material.

In general, the assembly of this kind of clamp is satisfactorily accomplished by merely locating the strap portions loosely in place and then drawing them together with suitable bolts or the like. It must be recognized, however, that a cam action is involved in the wedging operation, and the amount of squeeze achieved depends upon the angle of divergence of the inner leg surfaces and upon the distance which the straps can be drawn together after the first engagement of these surfaces against the flanges. The larger this angle of divergence and the larger this distance the greater the amount of squeeze. However, a very large angle of divergence should be avoided because o fthe difficulty of proper initial alignment prior to tightening, and a large distance for drawing the portions together is undesirable because it requires wide flanges and long strap legs.

As the angle of divergence and the above-mentioned distance are made progressively smaller the problem arises as to how enough squeeze can be obtained to make a tight seal, and the present invention solves this problem by providing a method and means for putting a pre-squeeze between the body and bonnet flanges before the clamp is installed. In accordance with the invention the clamp is installed, and tightened, while the pre-squeeze is still being exerted, and the pre-squeeze equipment is relieved either by tightening the clamp itself or after the clamp tightening has been completed.

More particularly the present invention involves pressing the body and bonnet together by devices other than the clamp, and further involves applying the clamp to retain at least some of the pressure exerted by such other devices and, in some instances, to add to such pressure. These pre-squeeze devices can be any suitable vise-like equipment and will usually be a tool which can be removed from the valve after the clamp has been tightened. However, it is within the scope of the invention for some or all of the pre-squeeze, vise-like equipment to be integral with the valve.

Accordingly, it is an object of the present invention to provide an improved method for assembling valves of the type having a body and bonnet secured together with a sealing member between them.

Another object is to provide a method of the kind described in which the body and bonnet are temporarily pressed together against the sealing member by application of force to the body and bonnet at locations other than those engaged by the permanent securing means.

Another object is to provide a method of the kind described in which the temporary pressure is removed after the permanent securing means is installed.

Another object is to provide a method of the kind described in which the temporary pressure exceeds the pressure exerted by the permanent securing means.

Another object is to provide improved means for assembling valves of the type having a body and a bonnet secured together with a sealing member between them.

Another object is to provide means for assembling valves of the kind described which comprises a vise for engaging the bonnet and body and pressing them together.

Another object is to provide means of the kind decribed in which the vise engages the bonnet and body at ocations other than those adapted to be engaged by the ermanent clamping device.

Another object is to provide means of the kind decribed in which at least a portion of the vise is separate rom and removable from the valve.

Another object is to provide means of the kind decribed in which the vise employs at least part of the ctuating mechanism.

Other objects will appear hereinafter.

The best modes in which it has been contemplated applying the principles of the present invention are shown in he accompanying drawings but these are to be deemed primarily illustrative for it is intended that the patent shall over by suitable expression in the appended claim whatver of patentable novelty exists in the invention disclosed.

In the drawings:

FIGURE 5 is a perspective view of a special valve body lock which can be used to advantage with the vise as hown in FIGS. 3 and 4;

FIGURE 7 is a sectioned perspective view of the valve f FIGS. 1–3 with the permanent clamp in place;

FIGURES 7A, 7B and 7C are fragmentary views of a ortion of a valve similar to that of FIG. 7, but in which e permanent clamping arrangement is slightly modified;

FIGURE 8 is a sectioned end elevation of a valve and mporary vise showing how the valve actuating mechnism can be employed as part of the vise; and FIG. 9 is an elevation view of a portion of the temporary ise.

Figure 1:
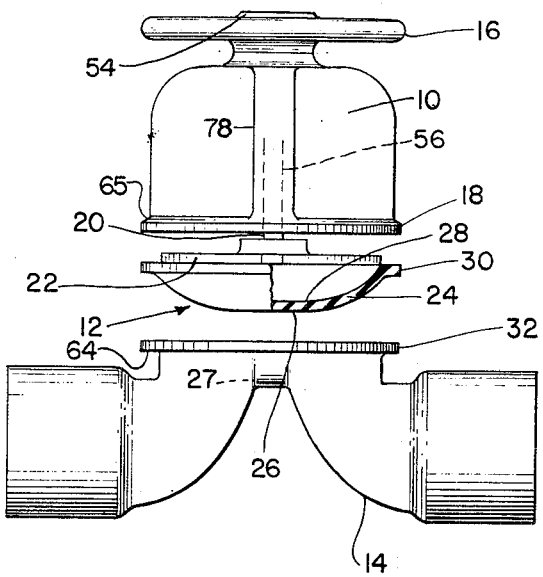
FIGURE 1 is an exploded side elevation view of a diahragm valve prior to assembly in accordance with the method of the present invention.

Referring now, more particularly, to the drawings, IG. 1 shows a bonnet 10 and diaphragm 12 which are eparated from each other and from a body 14. More articularly, the bonnet is a hollow cylindrical container aving a handwheel 16 at its upper end and a flange 18 t its lower end. The handwheel is connected to actuating nechanism which is housed within the bonnet and which ncludes a threaded spindle 20 and a compressor 22. The ctuating mechanism has other components which will be xplained in detail in connection with the description of IG. 8. It suffices at this point to state that the actuating nechanism is so arranged that rotation of the handwheel noves the spindle 20 and compressor 22 vertically.

The diaphragm 12 is made of flexible material such as ubber or synthetic rubber and has in its molded condition f FIG. 1 a central domed portion 24, the outside surface 6 of which is adapted to fit nicely against a valve seat 27 1 the body and the inside surface 28 of which fits nicely gainst the underside of the compressor 22. The diaphragm connected to the compressor at the center of the domed iaphragm portion so that the latter can be flexed to open nd close the valve in the manner which will be described.

The valve parts have been shown in the exploded position of FIG. 1 to illustrate an early stage of valve assembly. In this stage the diaphragm 12 has been connected to the compressor 22 which has been moved below the onnet flange 18 so that this connection is as easy as ossible. This movement of the compressor to the position shown is accomplished by turning the handwheel a greater amount than would be required to close the valve.

Figure 2:
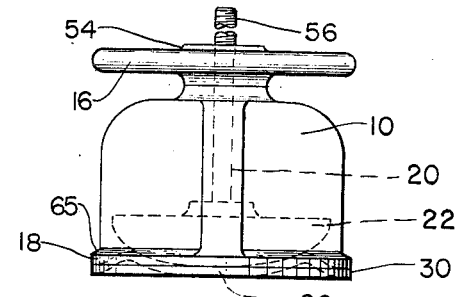
FIGURE 2 is a side elevation view like FIG. 1 but showing the compressor withdrawn somewhat into the bonnet o pull the diaphragm upward.
Figure 2:
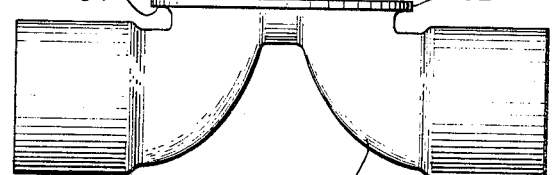

FIG. 2 shows a later stage in the assembly of the valve by the present invention. Arriving at this stage involves turning the handwheel in a valve-opening direction to lift the compressor until the diaphragm periphery 30 engages the bonnet flange 18 and further turning the handwheel until the central diaphram portion begins to turn inside out. The purpose of this slight distortion of the diaphragm by the further turning of the handwheel is to make sure that the diaphragm does not engage the seat in the body 14 when the bonnet and body are brought together. For example, if an attempt were made to bring the body and bonnet together when the parts were in the positions shown in FIG. 1 the positions of the diaphragm and compressor would prevent the periphery of the diaphragm from even engaging the bonnet flange 18.

Figure 3:
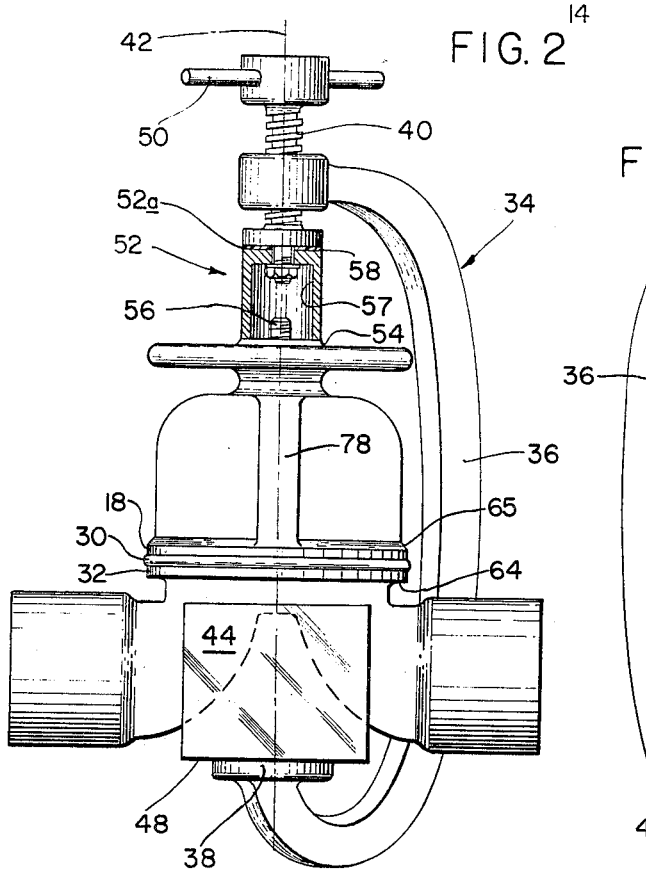
FIGURE 3 is a side elevation view like FIG. 1, showing the bonnet and body being pressed together against he periphery of the diaphragm by a temporary vise which is partially sectioned.
Figure 4:
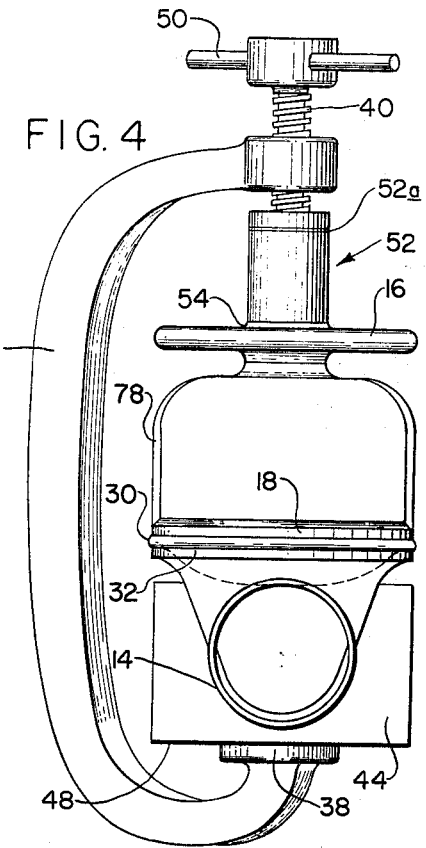
FIGURE 4 is an end elevation view of the valve and ise of FIG. 3.

However, with the parts in the positions shown in FIG. 2, the bonnet and body can be moved together to press the bonnet and body flanges 18 and 32 against the diaphragm periphery by a temporary vise 34 like that shown in FIG. 3 which illustrates another stage in the method. In the arrangement shown in FIG. 3 this vise 34 is essentially a C-clamp having a frame 36 with a pad 38 at one end and a screw 40 threaded in the other end along an axis 42 passing through the center of the pad 38. The C-clamp is large enough to embrace the valve plus a block 44 which has recesses 46 shaped to fit nicely against the underside of the valve body 14. (See FIG. 5.) The pad 38 is in turn arranged to engage the underside 48 of the block. The purpose of the block 44 is to distribute the forces exerted by the temporary C-clamp over a large area of the body surface so that when the walls of the body are relatively thin there is a minimum of distortion. It will be understood that blocks having different shapes may be used, or the use of a separate block may be omitted entirely and the pad 38 adapted to engage some part of the body directly, as shown in FIG. 7.

The screw 40 has a handle 50 on its upper end and a second pad 52 on its lower end. Preferably the pad 52 is shaped to engage the handwheel hub 54 around the opening therein from which the stem 56 protrudes, and the pad 52 is provided with a hollow recess 57 to accommodate this protrusion. In addition, the pad 52 is rotatably mounted on the screw 40 for turning about axis 42 so that the pad 52 can remain stationary relative to the handwheel hub. A thrust bearing 52a is provided as shown to minimize friction between pad 58 and the C-clamp frame.

Turning the handle 50 has the effect of pressing the body and bonnet flanges 18 and 32 toward each other to squeeze the diaphragm periphery 30 therebetween, and as the diaphragm is conventionally of a relatively thick piece of soft rubber or rubber-like material the force exerted by the vise will produce a significant compression of this diaphragm periphery. This compression permits the initial installation of a permanent clamp around the body and bonnet flanges in the manner shown in FIG. 7.

Figure 6:
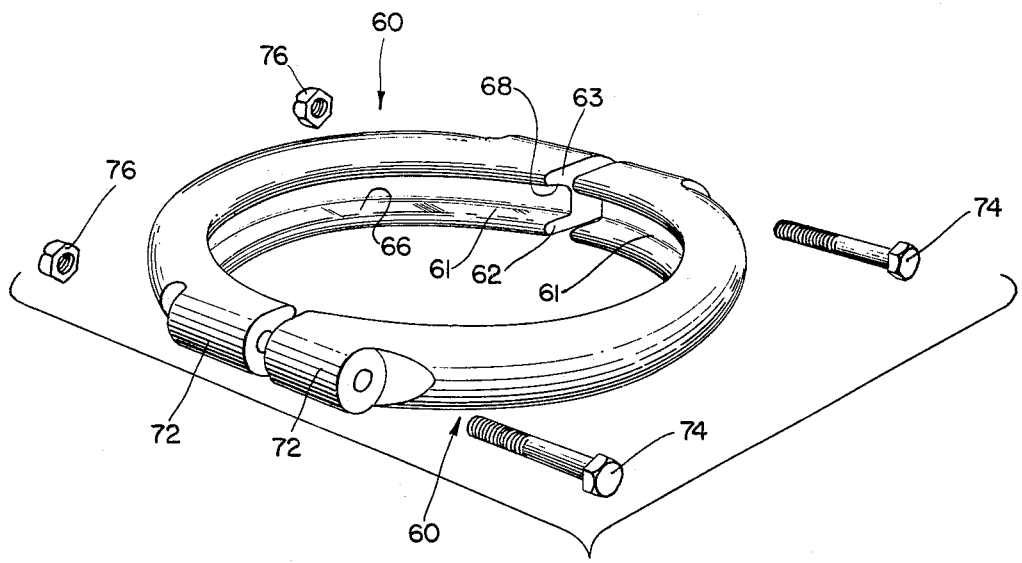
FIGURE 6 is a perspective view of a clamp which can be sed in the present invention to achieve the permanent onnection of the body and bonnet.

This clamp, which is shown apart from the valve in FIG. 6, is made up of two identical semi-circular strap portions 60, each having an internal groove 61 which provides a U-shaped cross-section. The legs 62 and 63 of the U are spaced to embrace the bonnet and body flanges when the diaphragm periphery is squeezed by the vise 34. Accordingly, the engaged surfaces 64 and 65 of the body and bonnet flanges and the inner faces 66 and 68 of the legs 62 and 63 could all be parallel as shown in FIG. 7A. However, this would require making the parts to very close tolerances so that the flanges 18 and 32 would fit between the legs 62 and 63 with a space 67 when the diaphragm was squeezed by the vise (FIG. 7B), and so that when the vise was removed the flanges 18 and 32 would move out and engage the leg faces 66 and 68 with enough squeeze still left in the diaphragm periphery 30 to achieve a leak-tight seal between the body flange 32 and and diaphragm (FIG. 7C). The small margins for error are evident in these three FIGS. 7A, 7B and 7C.

As a practical matter, maintaining dimensions to such close tolerances may be too expensive for large volume production, and it may be preferred to employ a cam action on the inner faces of the clamp strap portions so that when the strap portions are drawn together the flanges are wedged toward each other. In FIG. 7 this cam section is achieved by converging the inner surfaces 66 and 68 of the legs 62 and 63 of the U-shaped cross-section. This convergence is such as to permit insertion of the flanges into the mouth of the groove 61 when the diaphragm periphery is squeezed by the temporary vise.

Once embraced by the groove at the mouth thereof the flanges are wedged together by drawing the clamp strap portions into their final positions in which they form a circle. This drawing action forces the flanges deeper into the groove with its converging sides.

Because of the pre-squeeze provided by the vise the rate of convergence of the inner leg surfaces 66 and 68 and the depth of the groove 61 may be kept to a minimum so that the width of the clamp and of the flanges may be kept as small as possible and forces required to "make up" the clamp may be relatively low.

As indicated above, in FIGS. 7A, 7B and 7C the leg surfaces need not converge at all, in which case no particular force is required to make up the clamp.

FIGURE 7 shows a U-shaped clamp about to be made up on a valve which is being subjected to a temporary pressure in accordance with the present invention. The inner surface 66 of the lower leg 62 lies in a flat plane because the underside of the body flange 32 lies in such a plane. Accordingly, to achieve convergence the inner surface 68 of the upper leg 63 is angled with respect to these planes, and the upper surface 65 of the bonnet flange 18 is correspondingly angled to fit.

Enlargements 72 on the ends of the strap portions receive bolt and nut assemblies 74-76 in the conventional manner. However, when the strap portions are completely drawn together to form a circle their ends are spaced apart to accommodate the vertical ribs 78 extending from the opposite sides of the bonnet at the ends of the diaphragm seat 27. These ribs are hollow to provide internal grooves 82 for compressor projections 84 which thereby prevent the compressor from rotating during valve actuation, and these ribs interrupt the upper bonnet flange surface 65. However, these interruptions in the continuous clamping are short, and do not adversely affect the seat between the diaphragm periphery of the body flange at their locations.

The strap enlargements 72 extend radially outwardly far enough so that the bolts 74 pass clear of the ribs 78.

FIG. 8 shows another embodiment of apparatus according to the present invention. In this embodiment the vise employs part of the valve actuating mechanism. Thus, many diaphragm valves are of the so-called rising stem type shown in these drawings in which the spindle 20' is long enough to extend above the upper surface of the handwheel 16' when the valve is being opened. Accordingly, the frame 36' of the vise in FIG. 8 need only have a pair of fixed pads 38' and 52' spaced apart sufficiently to receive between them the block 44' and the valve in some position other than fully open. Pad 52' is further provided with an internal pad 57' and is retained in place on frame 36' by any conventional fastener such as flat head screw 55'. Then after the valve and block are placed in the position shown the handwheel is turned in a direction to open the valve which causes the top of stem 20' to engage the pad 57' and press against it. Further rotation of the handwheel results in the body and bonnet flanges 18' and 32' being squeezed together against the diaphragm periphery 30'. The mechanical advantage of the handwheel is adequate to achieve the squeezing required for the clamp to be easily installed, and once the clamp (like that of FIG. 6) has been made up the handwheel 16' can be turned in a closing direction to loosen the vise action, and the frame 36' and block 44' can be removed. In FIG. 8 the pad 52' shown also in FIG. 9 is preferably provided with an opening 53' in one side thereof large enough to pass the spindle 20'. For example, in FIG. 8 this opening may be the entire side of pad 52'. This opening enables the pad 52' to be moved laterally into place around the spindle 20' even when this spindle is projecting above the handwheel, as shown.

What is claimed is:

1. A method of assembling a valve having a hollow body with a closure member opening in one side thereof and with a flange around said opening; having a bonnet with a corresponding flange around one open end thereof and a stem operatively positioned along an axis perpendicular to said open end and presenting an end portion which a valve actuating mechanism causes to move along said axis in a direction away from said bonnet flange upon operating the valve toward an open position, and having a compressible sealing member which is adapted to fit between, and to have its opposed sides engaged by, said flanges and which has a certain thickness measured between said opposed sides, said method comprising the steps of:
(I) locating said sealing member with one of its said sides in contact with one of said body and bonnet flanges,
(II) positioning said body and bonnet with respect to each other so that the other of said body and bonnet flanges is in contact with the other side of said sealing member,
(III) holding said body and said end portion of said stem so as to restrain movement of said end portion along said axis, in the direction away from said bonnet flange,
(IV) operating said valve toward the valve open position while maintaining said holding step thereby causing said valve actuating mechanism to develop a counter force which urges the flange of the bonnet toward the flange of said body until the distance between said flanges is less than the said sealing member thickness,
(V) securing said body and bonnet together to maintain said distance less than said thickness,
(VI) releasing said force.

References Cited

UNITED STATES PATENTS

| | | | |
|---|---|---|---|
| 184,599 | 11/1876 | Ehrhardt | 285—364 X |
| 1,978,603 | 10/1934 | Saunders | 251—331 X |
| 2,863,631 | 12/1958 | Boteler | 251—331 |
| 3,026,128 | 3/1962 | Willis | 285—18 |
| 3,067,764 | 12/1962 | Geary | 251—331 X |

FOREIGN PATENTS

| | | |
|---|---|---|
| 1,103,706 | 3/1961 | Germany. |

JOHN F. CAMPBELL, Primary Examiner

D. C. REILEY, Assistant Examiner

U.S. Cl. X.R.

29—257; 137—316; 251—331